ize> United States Patent [19]

Guntermann

[11] 3,942,579

[45] Mar. 9, 1976

[54] PROCESS FOR THE ALUMINOTHERMIC WELDING OF RAILS

[75] Inventor: Hans Guntermann, Essen-Steele, Germany

[73] Assignee: Elektro-Thermit GmbH., Germany

[22] Filed: June 17, 1975

[21] Appl. No.: 587,572

Related U.S. Application Data

[63] Continuation of Ser. No. 327,314, Jan. 29, 1973, abandoned.

[52] U.S. Cl. ................. 164/54; 164/105; 238/162; 238/164
[51] Int. Cl.$^2$ ........................................ B23K 23/00
[58] Field of Search ............ 164/105, 54; 29/498.5; 238/162, 164

[56] References Cited
UNITED STATES PATENTS

| | | | |
|---|---|---|---|
| 580,971 | 4/1897 | Falk | 164/105 X |
| 1,440,256 | 12/1922 | Wattmann | 164/105 X |
| 1,917,868 | 7/1933 | Begtrup | 164/105 X |
| 2,932,863 | 4/1960 | Ahlert | 164/105 X |
| 2,977,651 | 4/1961 | Boutet | 164/105 X |
| 3,103,719 | 9/1963 | Bishop et al. | 164/54 X |
| 3,495,801 | 2/1970 | Kruger | 164/105 X |

FOREIGN PATENTS OR APPLICATIONS

| | | | |
|---|---|---|---|
| 1,587,253 | 3/1970 | France | 29/498.5 |
| 1,046,449 | 8/1955 | Germany | 29/498.5 |
| 1,061,157 | 12/1956 | Germany | 29/498.5 |

OTHER PUBLICATIONS

*Welding Handbook*, Section One, Fifth Edition, edited by Arthur L. Phillips, pp. 7.7, 7.8, 5.12, Technical Library, published 1962.

*Primary Examiner*—R. J. Shore
*Attorney, Agent, or Firm*—James E. Bryan

[57] ABSTRACT

A process for the aluminothermic welding of rails in which the rail ends to be joined are surrounded by a prefabricated, dry refractory casting mold and sealed from the rails with plastic mold materials, such as, moistened sand; a reaction crucible is arranged above the casting mold and filled with an aluminothermic reaction mixture; the rail ends are preheated, for example, by burning a mixture of propane and oxygen and directing the flames downwardly into the riser-duct of the casting mold for a period of time up to about 2 minutes and at a temperature between about 300°C and about 700°C; the aluminothermic reaction mixture in the reaction crucible is ignited; and, upon completion of the reaction of the aluminothermic reaction mixture, the lower outlet of the reaction crucible is opened and the steel melt is poured into the mold.

The amount of aluminothermically produced steel utilized is between about 0.15 and about 0.25 parts by weight based on the weight per meter of the rails to be welded.

7 Claims, No Drawings

PROCESS FOR THE ALUMINOTHERMIC WELDING OF RAILS

This is a continuation, of application Ser. No. 327,314, filed Jan. 29, 1973, and now abandoned.

This invention relates to a process for the aluminothermic welding of rails in which the rail ends to be joined together are surrounded by a refractory casting mold and are heated before the aluminothermically produced steel is cast into the casting mold.

Conventionally, the rail ends to be joined together in the aluminothermic welding of rails are heated in the mold before casting. For example, a process and a machine for the aluminothermic welding of workpieces, preferably rails, have been proposed in which the rail ends surrounded by molds (casting molds) are preheated by flames which enter a riser duct of the casting mold from above. Preheating in this context is to be understood to be the heating of the rail joints to around 1000°C. before aluminothermically produced steel, introduced into the casting mold at a temperature in excess of 2000°C., fuses the rail ends together.

In conventional processes for the aluminothermic welding of rails, preheating of the rail ends to around 1000°C., which can be carried out in 5 to 25 minutes, for example, in the case of rails weighing approximately 50 kg. per meter, is regarded as the fundamental requirement for obtaining satisfactory welds. Preheating to temperatures below this limit is unacceptable, and even higher preheating temperatures are recommended for supporting the fusing effect of the hot liquid steel poured into the casting mold after preheating.

It has been found that, although promoting the necessary fusion of the rail ends, the intense preheating has the disadvantage that those zones of the rails adjacent the welding zone are also heated to and kept at temperatures that are high enough to transform or, at least, affect their structure. This results in the formation of coarse-grain and fine-grain zones adjoining the weld which show considerable differences in hardness and toughness by comparison with the rail material that is not affected by heat. These differences can cause buckling and denting, the reduction in toughness through coarse-grain formation in the zones adjoining the weld having a particularly adverse effect because this can impair resistance to fracture. These well known disadvantages accompanying intense preheating have hitherto been accepted as inevitable in securing satisfactory fusion.

In order to obviate the disadvantages involved in intense preheating and also to shorten the time required to complete a weld, attempts have also been made to dispense with preheating altogether and to obtain the increase in the temperature of the rail ends required for fusion solely from the hot, liquid, aluminothermically produced steel. This involves a relatively large quantity of aluminothermically produced steel, because some of the hot liquid melt is used in heating the rail ends to the welding temperature. This process can be carried out by using a casting mold for aluminothermic rail welding with riser-duct outlets extending upwards in the vicinity of the outer edges of the rail base, and a bolt arranged above the rail head which forms the base of the pouring gate. In this casting mold, the pouring gate is separated from the riser-duct outlets.

In the above-mentioned process for welding rails in which the rail ends are preheated and fused solely by the aluminothermically produced steel, those zones adjacent the weld are also heated to high temperatures, although the heat is very quickly dissipated into the adjoining cold rail zones. The result of this is that the width of the heat-influenced zone is reduced as required, although chilling can occur, a phenomemon which must be avoided under all circumstances on account of the danger of fracture.

In the practical application of the process just discussed, highly reactive aluminothermic mixtures are used to produce a steel melt with as high a heat content as possible. Unfortunately, these mixtures are difficult to control so that considerable amounts of the reacting mixture and reaction products are thrown out of the reaction crucible. Apart from interfering with the working cycle, this can also result in changes in the composition of the required melt. In addition, despite a relatively large quantity of welding material, the rail ends cannot always be fused with the required degree of safety, especially in the case of relatively low rail temperatures. If, in addition, the rails carry moisture, this results in pore formation. For all these reasons, this process has never been worked on a large scale on account of the disadvantages which it involves.

According to the present invention, there is provided a process for the aluminothermic welding of rails, wherein the rail ends to be joined together are surrounded by a refractory casting mold and are preheated over a period of up to 2 minutes to a temperature from about 300°C. to about 700°C., whereafter aluminothermically produced steel is poured into the casting mold. The present process is capable of exploiting the advantages of conventional processes and of avoiding or reducing harmful structural changes. Furthermore, the welds can be completed relatively quickly.

The period during which the rail ends are preheated should be no longer than 2 minutes, the temperature obtained within the temperature range being essentially determined by the burners and the fuel/ oxygen or fuel/air mistures used. The size and composition of the weld portion must be such that fusion is reliably obtained, in the absence of a chilling effect, at a preheating temperature of 300°C., while harmful coarse-grain and fine-grain zones in the rail material, in the zones adjacent the weld, are avoided at a preheating temperature of 700°C.

A particular advantage of the present process is that, by providing for satisfactory fusion of the rail ends, it avoids or reduces unfavorable transformations and changes in the rail material, thus significantly increasing the reliability of welding along the track. Another advantage is that, by virtue of the brief preheating period of not more than 2 minutes, the time hitherto required for completing of the track can be significantly reduced so that rail traffic is affected to a far lesser extent.

The process according to the present invention will now be illustrated by the following Example.

EXAMPLE

The ends of aligned rails to be welded, the rails weighing 50 kg. per meter, are laid with a gap of 24 mm. and surrounded by a prefabricated, dry refractory casting mold which is sealed from the rail with plastic mold materials, such as, for example, moistened sand.

After the casting mold has been set up, the crucible required for the reaction is arranged above the casting mold and, after the lower outlet of the crucible has been closed, the crucible is filled with aluminothermic welding composition intended for welding. The aluminothermic mixture is best used in a quantity corresponding to from 0.15 to 0.25 parts by weight, based on the weight of the rail per meter. In the present case, the mixture is used in a quantity of 10 kg. This is followed by preheating of the rail ends, preferably by flames produced by burning a mixture of propane and oxygen, the flames being arranged to enter the riser-duct of the casting mold from above.

On completion of preheating, the aluminothermic welding composition is ignited in the reaction crucible; and, on completion of the reaction, the lower outlet is opened by lifting a tapping pin to allow the steel melt to flow into the mold where it fuses and joins the rail ends together. After the steel poured in has hardened, the casting mold is removed and the weld is finished in a conventional manner.

What is claimed is:

1. A process for the aluminothermic welding of rails; comprising, surrounding the rail ends to be joined by a refractory casting mold, preheating said rail ends for a period of time of up to 2 minutes at a temperature between about 300°C and about 700°C, and pouring aluminothermically produced steel into said casting mold in an amount between about 0.15 and about 0.25 parts by weight based on the weight per meter of the rails to be welded.

2. A process in accordance with claim 1 wherein the refractory casting mold is a prefabricated, dry refractory casting mold.

3. A process in accordance with claim 2 wherein the refractory casting mold is sealed from the rails with a plastic mold material.

4. A process in accordance with claim 1 wherein the rail ends are preheated by burning a mixture of propane and oxygen and directing the flames downwardly into the riser-duct of the refractory casting mold.

5. A process in accordance with claim 1 wherein a reaction crucible is arranged above the refractory casting mold and said crucible is filled with an aluminothermic reaction mixture.

6. A process in accordance with claim 5 wherein the aluminothermic reaction mixture is ignited at the end of the period of preheating the rail ends.

7. A process in accordance with claim 6 wherein the lower outlet of the crucible is opened and the steel melt is poured into the mold after the reaction of the aluminothermic reaction mixture is completed.

* * * * *